(12) United States Patent
Livergood

(10) Patent No.: US 9,648,568 B2
(45) Date of Patent: *May 9, 2017

(54) HYBRID DUAL-BAND SATELLITE COMMUNICATION SYSTEM

(71) Applicant: Foundation Telecommunications, Inc., Rogers, AR (US)

(72) Inventor: George A. Livergood, Olathe, KS (US)

(73) Assignee: Foundation Telecommunications, Inc., Rogers, AR (US)

( * ) Notice: Subject to any disclaimer, the term of this patent is extended or adjusted under 35 U.S.C. 154(b) by 49 days.

This patent is subject to a terminal disclaimer.

(21) Appl. No.: 14/704,876

(22) Filed: May 5, 2015

(65) Prior Publication Data

US 2015/0237587 A1 Aug. 20, 2015

Related U.S. Application Data

(63) Continuation-in-part of application No. 13/760,821, filed on Feb. 6, 2013, now Pat. No. 9,026,106.

(60) Provisional application No. 61/595,536, filed on Feb. 6, 2012.

(51) Int. Cl.
*H04W 52/24* (2009.01)
*H04B 7/185* (2006.01)
*H04W 72/04* (2009.01)

(52) U.S. Cl.
CPC ...... *H04W 52/243* (2013.01); *H04B 7/18513* (2013.01); *H04W 52/245* (2013.01); *H04W 72/0473* (2013.01)

(58) Field of Classification Search
CPC ............. H04W 52/243; H04W 52/245; H04W 72/0473; H04B 7/18513

USPC ...... 370/315, 316, 318; 455/13.4, 12.1, 418, 455/430, 427, 522

See application file for complete search history.

(56) References Cited

U.S. PATENT DOCUMENTS

| | | |
|---|---|---|
| 4,740,795 A | 4/1988 | Seavey |
| 4,785,306 A | 11/1988 | Adams |
| 5,619,525 A | 4/1997 | Wiedeman et al. |
| 5,745,084 A | 4/1998 | Lusignan |
| 6,067,453 A | 5/2000 | Adiwoso et al. |
| 6,212,360 B1 | 4/2001 | Fleming, III et al. |

(Continued)

OTHER PUBLICATIONS

"IDirect Techonologies Broadband VSAT System Summary", Product Brochure,iDirect, 13865 Sunrise Valley Dr, Herndon, AV, 2017, www.idirect.net, Feb. 2008.

*Primary Examiner* — Duc C Ho
(74) *Attorney, Agent, or Firm* — Law Office of Mark Brown, LLC; Mark E. Brown; Christopher M. DeBacker

(57) ABSTRACT

A hybrid satellite communication system in which a hub station transmits signals to remote stations through a satellite at a relatively low frequency which is unaffected by weather effects and in which the remote stations transmit signals to the hub station at a relatively higher frequency which enables the use of more economical equipment at the remote stations. The hub station senses the signal quality or strength received from each remote station and transmits power control signals to remote stations with poor signal strengths to cause such remote stations to increase their output power to overcome weather effects. The power control signals are transmitted on the lower frequency to prevent the power control signals from being masked by the weather effects.

15 Claims, 5 Drawing Sheets

(56) References Cited

U.S. PATENT DOCUMENTS

| | | | |
|---|---|---|---|
| 6,256,496 B1* | 7/2001 | Dintelmann | H04B 7/18584 455/12.1 |
| 6,301,232 B1* | 10/2001 | Dutta | H04B 7/18513 370/321 |
| 7,505,736 B2 | 3/2009 | Min | |
| 7,590,083 B2* | 9/2009 | Haugli | H04B 7/2041 370/320 |
| 7,653,348 B2 | 1/2010 | Karabinis | |
| 2010/0220585 A1 | 9/2010 | Poulson et al. | |

* cited by examiner

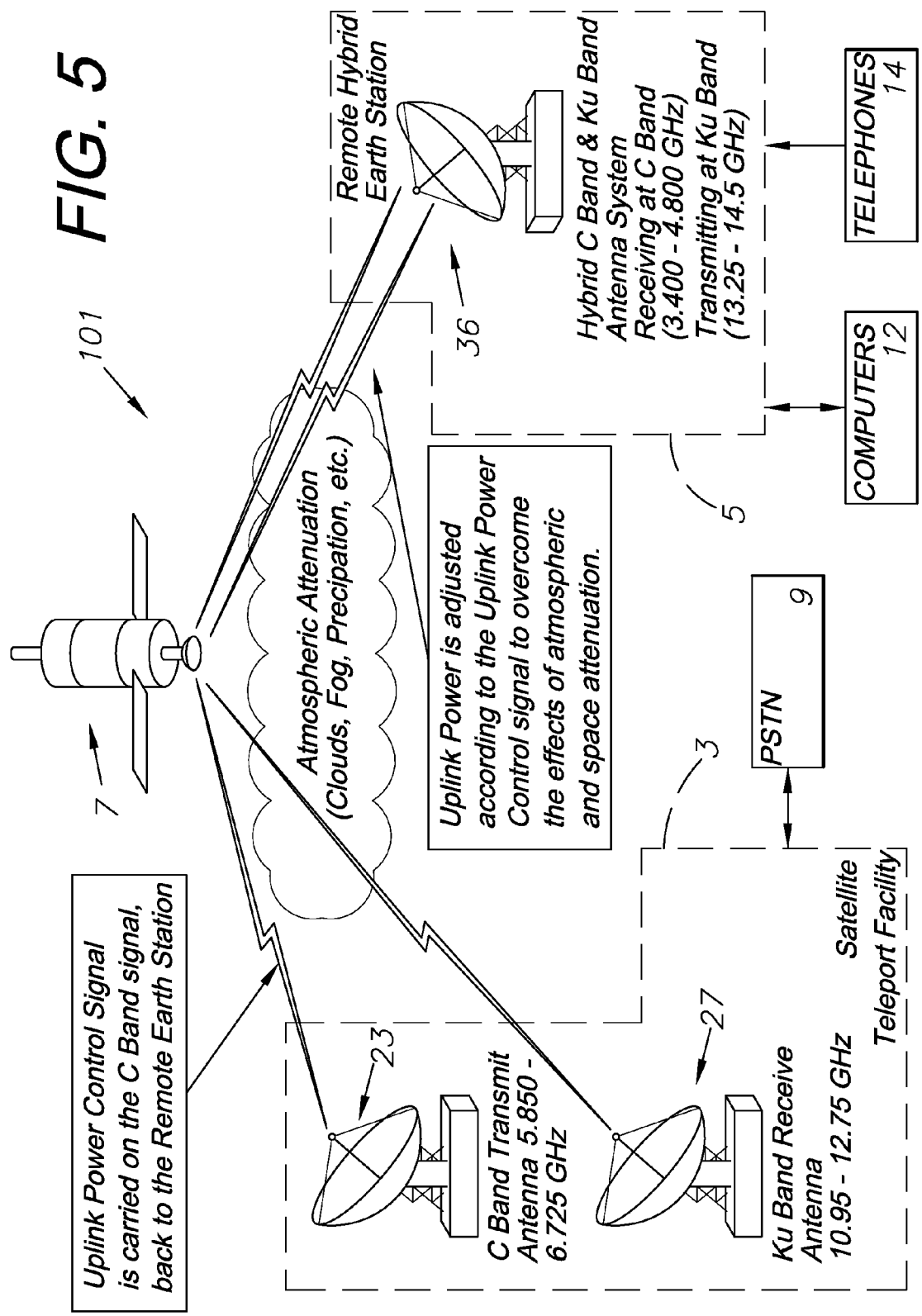

HYBRID DUAL-BAND SATELLITE COMMUNICATION SYSTEM

CROSS-REFERENCE TO RELATED APPLICATIONS

This application is a continuation-in-part of and claims priority in U.S. patent application Ser. No. 13/760,821, filed Feb. 6, 2013, now U.S. Pat. No. 9,026,106, issued May 5, 2015, which claims priority in U.S. Provisional Patent Application No. 61/595,536, filed Feb. 6, 2012, both of which are incorporated herein by reference.

BACKGROUND OF THE INVENTION

1. Field of the Invention

The present invention relates generally to satellite communication systems and, more particularly, to such a system which communicates from a communication hub to a remote station on one band and from the remote station to the hub on another band.

2. Description of the Related Art

Modern telecommunication systems provide means for communicating vocal conversations, email, and various kinds of data from originating sources to destinations over twisted pair landlines, coaxial cables, fiber optic cables, and radio frequency communication links. Satellite communications have become an important mode of communications for large and small entities for both one-way services, such as television signals, and two-way services such as data processing services, satellite internet services, and the like. Two-way communication satellite services are typically set up as a head-end or hub station which is interfaced to a large scale communication network, such as the public switched telephone network (PSTN) infrastructure, and remote stations which communicate through a communication satellite to the hub station and through the hub station to the PSTN. The PSTN provides conventional telephone services and data communication over dedicated lines, the internet, and other links. Equipment for remote satellite stations has evolved to what is known as VSAT or very small aperture terminal satellite dishes.

The present standard for VSAT satellite communications is the use of Ku band (12 to 18 GHz) satellite technology in order to use meter or sub-meter sized satellite antennas and to avoid costly licensing and frequency coordination. The problem with Ku band satellite technology is that it is highly susceptible to local rain or weather fade due to the nature of the frequencies used. For this reason, networks have to be tolerant of frequent signal fades or outages during the presence of rain, snow, and storm clouds. This occurs in all Ku band transmissions whether it is for residential satellite television or VSATs.

Some networks attempt to mitigate the fade through the use of automatic uplink power control at the customer VSAT location. This technology gradually increases the transmit power at the remote customer location via a command from the hub location when the hub location senses that there is attenuation somewhere in the path between the remote location and the hub. This works some of the time quite well, but the same local weather anomaly that causes the problem with the inbound signal to the hub also creates a problem with the outbound power control signal to the remote site. Eventually, the control signal cannot reach the remote site electronics with sufficient strength and the remote site shuts down until it can receive a valid command.

This is very bad for reliability and, as a result, Ku band networks are generally designed to be out of service for about 50 hours per year due to weather. For government and customer applications that need to know weather and other critical information, these 50 hours of down time cannot be tolerated.

Heretofore there has not been available a dual-band satellite communications system with the features and elements of the present invention.

SUMMARY OF THE INVENTION

The present invention provides a hybrid satellite communication system in which a hub station transmits signals to remote stations through a satellite at a relatively low frequency which is unaffected by weather effects and in which the remote stations transmit signals to the hub station at a relatively higher frequency which enables the use of more economical equipment at the remote stations. The hub station senses the signal quality or strength received from each remote station and transmits power control signals to remote stations with poor signal strengths to cause such remote stations to increase their output power to overcome weather effects. The power control signals are transmitted on the lower frequency to prevent the power control signals from being masked by the weather effects.

An embodiment of the present invention provides a technique to send the outbound signals from the hub at a much lower C band (4 to 8 GHz) frequency that is virtually unaffected by weather via the same satellite that is receiving a Ku band signal from the remote site. As a consequence, the remote site never or nearly never loses its control signal and is always changing its power in response to weather effects to thereby eliminate outages. This requires judicious selection of satellite transponders, special antennas, and specially designed feeds that allow simultaneous transmission of Ku band while receiving C band.

An embodiment of the present invention provides a hybrid satellite antenna for the remote stations to enable the remote station to transmit and receive signals on different bands using a single antenna assembly.

An embodiment of the present invention employs an offset feed/clear aperture antenna dish to enable the use of a reduced size dish without causing interference effects by receiving signals from or transmitting signals to multiple satellites.

Various objects and advantages of the present invention will become apparent from the following description taken in conjunction with the accompanying drawings wherein are set forth, by way of illustration and example, certain embodiments of this invention.

BRIEF DESCRIPTION OF THE DRAWINGS

The drawings constitute a part of this specification and include exemplary embodiments of the present invention illustrating various objects and features thereof

FIG. 5 is a schematic diagram of a hybrid C/Ku band satellite communication system comprising a first modified embodiment of the present invention.

DETAILED DESCRIPTION OF THE PREFERRED EMBODIMENTS

I. Introduction and Environment

Figure 1:
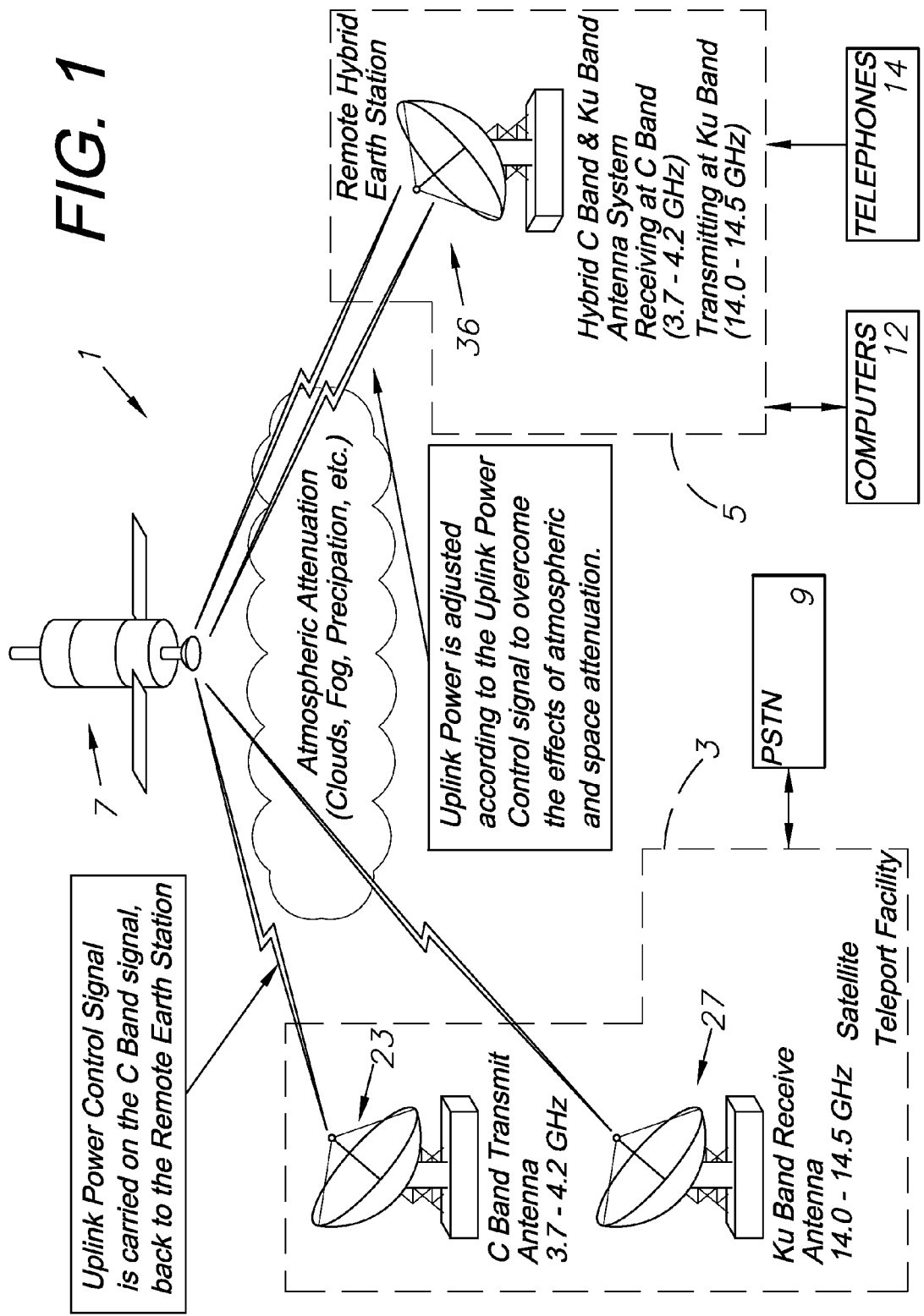
FIG. 1 is a diagrammatic view illustrating an embodiment of a hybrid C/Ku band satellite communication system.

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning II. Hybrid Dual-Band Satellite Communication System 1

Referring to the drawings in more detail, the reference numeral 1 generally designates an embodiment of a hybrid C/Ku band satellite communication system according to the present invention. The illustrated system 1 generally includes a satellite teleport facility or hub station 3 which communicates with a plurality of remote stations 5 by means of a geostationary communication satellite 7. The hub station 3 is interfaced to a large scale communication network, such as the public switched telephone and data network (PSTN) 9 which provides telephone and data communication services. The remote stations 5 include communication devices, such as computers 12 and telephones 14, which communicate with the PSTN 9 by way of the system 1.

Figure 2:
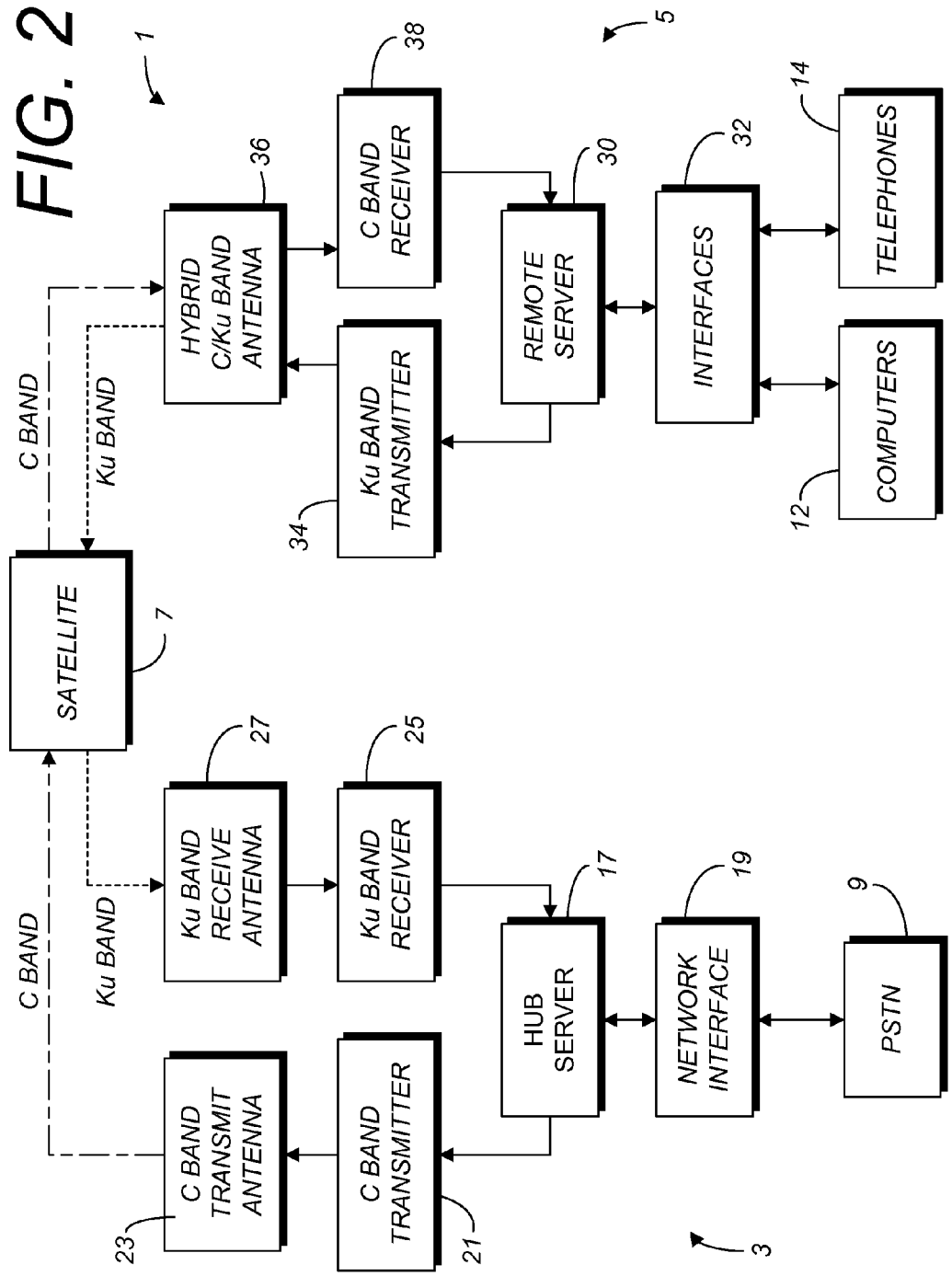
FIG. 2 is a block diagram illustrating components of an embodiment of the present invention.

Referring to FIGS. 1 and 2, the illustrated hub station 3 includes a hub server 17 which is a processor or computer that controls the flow of data through the hub station 3. The hub server 17 includes network interface circuitry 19 which interfaces the hub server 17 to the PSTN 9. The illustrated hub station 3 includes a C band transmitter 21 which receives data from the hub server 17 and transmits the data through a C band antenna 23 to the satellite 7 on a C band frequency in the range of about 3.7 to 4.2 GHz. The hub station 3 includes a Ku band receiver 25 which receives data from a Ku band antenna 27 from the satellite 7 on a Ku band frequency in the range, as illustrated, of about 14 to 14.5 GHz. The transmitter 21 and receiver 25 are interfaced to the hub server 17.

Each remote station 5 includes a remote server 30 which is a processor or computer that controls the flow of data through the remote station 5. The remote station 5 includes interface circuitry 32 to interface the remote server 30 to the computers 12 and telephone sets 14 communicating therewith. The illustrated remote server 30 outputs data to the satellite 7 through a Ku band transmitter 34 and a hybrid C/Ku band antenna 36 on the same Ku band frequency range as the hub receiver 25 and receives data from the satellite 7 through the hybrid antenna 36 through a C band receiver 38 on the same C band frequency range as the hub transmitter 21. The use of the hybrid antenna 36 economizes the implementation of the remote station 5 as far as the purchase and mounting of an antenna and wiring therefor.

The illustrated satellite 7 shown in FIG. 1 carries a plurality of C band and Ku band transponders (not shown). The transmission of signals from the hub station 3 and the satellite 7 on C band frequencies assures that such signals will reach the remote station 5, since the C band range of frequencies are virtually immune to deterioration from weather effects. The hub server 17 monitors the signal quality of the Ku band signals received from the remote stations 5. The output power of the remote Ku band transmitter 34 can be controlled by the remote server 30 to increase or decrease as needed to provide reliable signal quality from the remote station 5 to the satellite 7 and from there to the hub station 3. The hub server 17 can control a remote server 30 to increase the output power of its transmitter 34 by an uplink power control UPC signal to overcome deterioration or fade of the signal from the remote station 5 due to weather effects. The UPC signal is sent at the C band frequency range to assure that it is received by the remote station 5.

A geostationary satellite 7 is a satellite which has an orbital period equal to the Earth's rotational period (one sidereal day), and thus appears motionless, at a fixed position in the sky, to ground observers. A geostationary orbit can only be achieved by locating a satellite at an altitude very close to 35,786 km (22,236 mi) above the surface of the earth and directly above the equator. Communications satellites and weather satellites are often given geostationary orbits so that the ground antennas that communicate with them do not have to move to track them, but can be pointed permanently at the position in the sky where they stay. Because of efforts to maximize the coverage of geostationary satellites, there tend to be clusters of closely spaced satellites positioned over the equator to serve national or continental areas, such as the North American continent from coast to coast. However, there is a limit to how closely satellites can be spaced to avoid interference issues when using economical sized antenna dishes on the ground. Currently, the minimum spacing is about two degrees of arc.

Smaller sized dishes tend to be more economical than larger dishes and require less rugged mounting structure. However, smaller dishes have larger beam angles than larger dishes. The larger beam angle of a small dish may receive signals from two or more adjacent satellites and transmit signals to two or more satellites. The reception of signals from multiple sources either at the satellite or ground station may be interpreted as interference and cause undesired effects.

Figure 3:
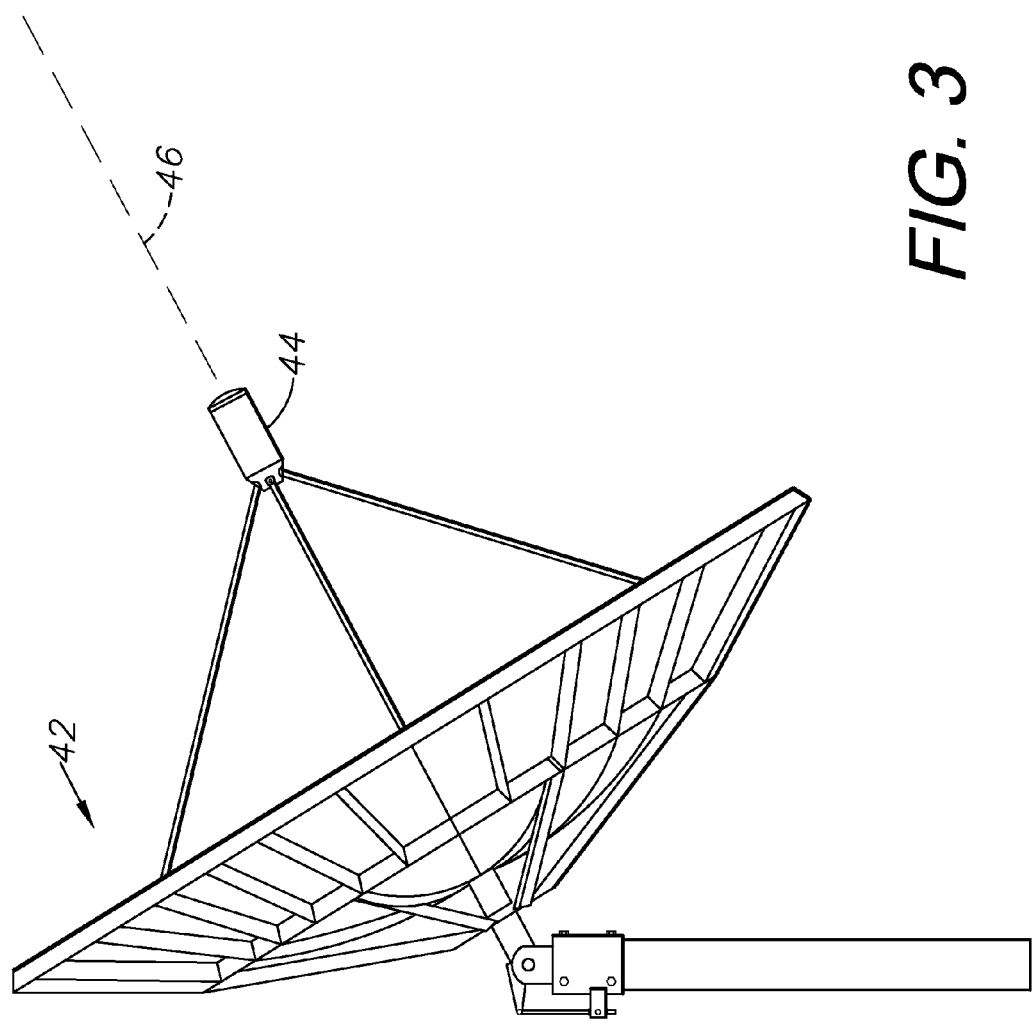
FIG. 3 is a side elevational view of an axial feed antenna dish which may be employed in an embodiment of the present invention.

Referring to FIG. 3, a common type of dish for communicating with satellites is an axial feed dish 42 which has a feed assembly 44 located along the axis 46 of the dish 42. Typically, the dish 42 is oriented to intersect the axis 46 thereof with the satellite with which it is intended to communicate. The axial feed dish 42 has no simple mechanism for avoiding transmitting to or receiving from multiple satellites if the size is reduced below a certain diameter. Thus an axial feed dish such as the dish 42 must be sized large enough to control its beam angle.

Figure 4:
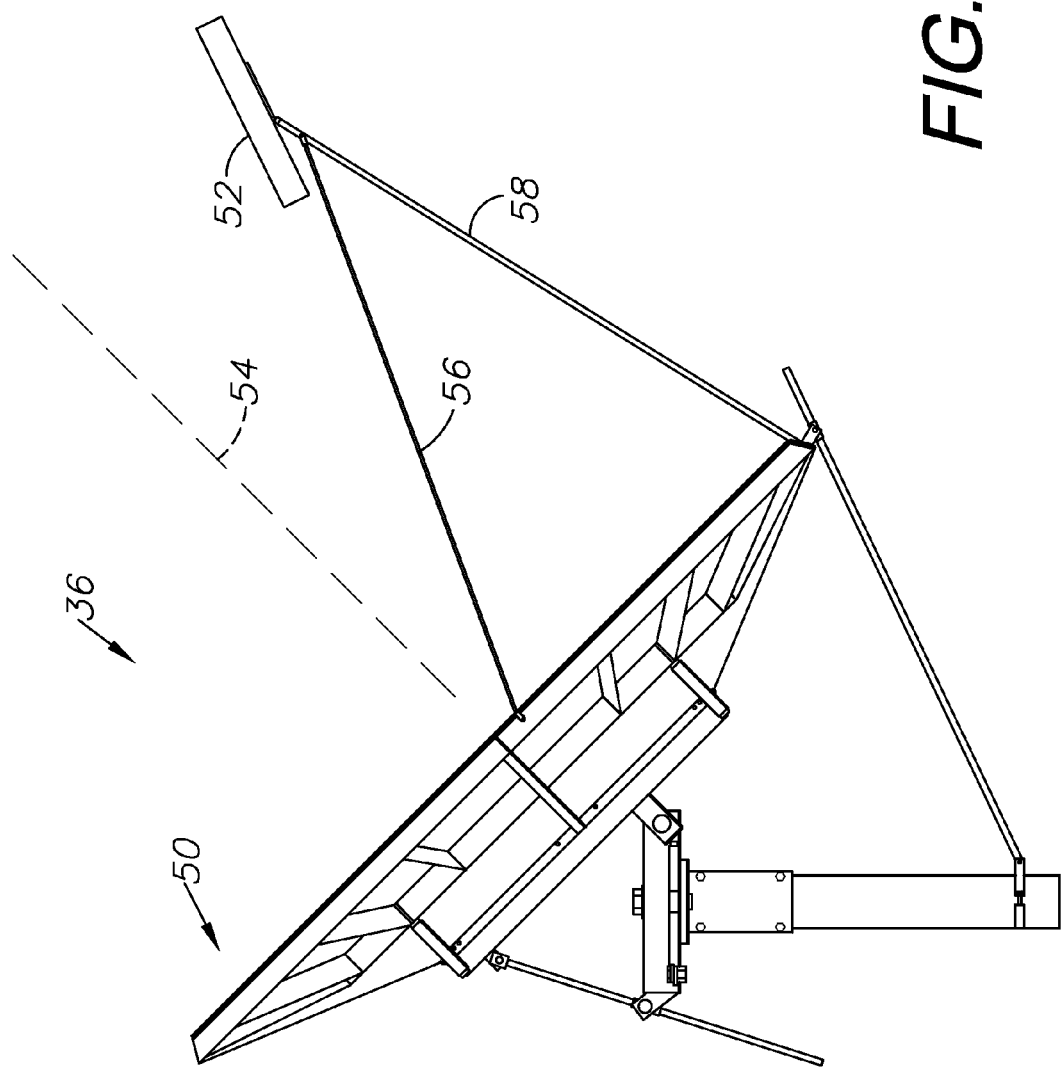
FIG. 4 is a side elevational view of an offset feed, clear aperture antenna dish which may be employed in an embodiment of the present invention.

Referring to FIG. 4, an embodiment of the system 1 employs an offset feed/clear aperture dish 50 as the hybrid antenna 36. The dish 50 has a feed assembly 52 located at an angle which is offset from the axis 54 thereof. The illustrated dish 50 is nominally a 2.4 meter dish and is appropriate for use on both C band and Ku band frequencies. The dish 50 is referred to as a clear aperture type dish because the offset feed assembly 52 does not block energy reflected from the dish surface, as can occur with an axial feed dish 42. The dish 50 may be implemented as a 2.4 meter Model 1244 or 1251 dish manufactured by Prodelin Corporation (www.prodelin.com). Alternatively, other types of dishes may be used, such as the 3.8 meter Model 1383, also manufactured by Prodelin. The feed assembly 52 is a dual band feed assembly which is designed to receive in a C band frequency range and transmit in a Ku band range. The feed assembly 52 may be implemented as a Prodelin Model 0800-4487-1 or the like. The illustrated feed assembly 52 is supported by struts 56 and 58 in spaced and angled relation to the surface of the dish 50 to radiate radio frequency energy toward the dish 50 or to receive energy reflected from the dish 50.

Because the feed assembly 52 is angularly offset from the axis 54, aiming of the dish 50 toward the satellite 7 is complicated somewhat, since the surface of the dish 50 must be angled in such a manner as to reflect the signal energy from the satellite toward the feed assembly 52 and from the feed assembly 52 toward the satellite. However, the offset feed dish 50 can be used to reduce the multiple satellite interference effect of the beamwidth thereof, such that a smaller size dish can be used than would otherwise be possible.

While the system 1 has been described using C band frequencies from the hub station 3 to the remote stations 5 and Ku band frequencies from the remote stations 5 back to the hub 3, it is foreseen that other sets of bands could be employed, such as Ka band frequencies (26.5 to 40 GHz) from the remote stations 5 to the hub station 3.

FIG. 5 shows a hybrid, dual-band satellite communication system 101 comprising a first modified embodiment of the present invention. The system 101 can operate at any suitable frequencies, including C and Ku band frequencies. Without limitation, examples of extended frequency ranges for different models of block up converters (BUCs) and low-noise block converters (LNBs) for the system 101 are as follows:

TABLE 1

Ku-Band Variations

| | Transmit Frequency (GHz) | Receive Frequency (GHz) |
|---|---|---|
| Extended Ku-Band | 13.25-14.5 | 10.95-12.75 |

TABLE 2

C-Band Variations

| | Transmit Frequency (GHz) | Receive Frequency (GHz) |
|---|---|---|
| Extended C-Band | 5.850-6.725 | 3.400-4.800 |

Moreover, the antennas can comprise 3.8 m Prodelin antennas, e.g. Model No. 1241 and Model No. 1385. A variety of other antenna sizes and configurations can be used with the systems of the present invention. Without limitation, typical antenna dish sizes can range from about 1.5 m to about 4.6 m. The systems of the present invention can use a separate Ku band uplink with a C band downlink.

It is to be understood that the invention can be embodied in various forms, and is not to be limited to the examples discussed above. The range of components and configurations which can be utilized in the practice of the present invention is virtually unlimited.

The invention claimed is:

1. A dual-band satellite communication system comprising:
   a hub station including a hub transmitter operating on a first band frequency, a hub receiver operating on a second band frequency, and a hub server;
   wherein said first band operates at a frequency band between 3.400 GHz and 8 GHz, and said second band is in the Ku frequency band;
   a plurality of remote stations each including a remote server having a processor, a remote transmitter operating on said second band frequency, a remote receiver operating on said first band frequency, and a hybrid antenna including an antenna dish, said antenna operating on both of said first and second band frequencies;
   a geostationary communications satellite; and
   wherein said hub station is adapted to instruct said remote server using said first band frequency to either increase or decrease the output power of said remote transmitter; and modifying the output power level of the remote transmitter using said remote server.

2. The system of claim 1, wherein said first band is in the C frequency band.

3. The system of claim 1, wherein said first band operates at a frequency between 3.400 GHz and 4.800 GHz.

4. The system of claim 1, wherein said second band operates at a frequency between 13.25 GHz and 14.5 GHz.

5. The system of claim 1 further comprising a public switched telephone network (PSTN), wherein:
   said hub server is adapted to interface with the PSTN, said first band transmitter, and said second band receiver;
   said first band transmitter is adapted to receive information from said hub server and is further adapted to transmit that information on said first band frequency to said satellite; and
   said second band receiver is adapted for receiving information from said satellite on said second band frequency.

6. The system of claim 1, wherein said hub server is adapted to instruct said remote server to either increase or decrease the output power of said remote transmitter.

7. The system of claim 1, wherein said antenna dish is an axial feed antenna dish including a feed assembly located along an axis running perpendicular to a front face of the center of said dish.

8. The system of claim 7, wherein said antenna dish front face has a diameter between 1.5 meters and 4.6 meters.

9. The system of claim 1, wherein said antenna dish is an offset clear aperture dish, including a feed assembly located at an angle offset from an axis running perpendicular to the center of a front face of said antenna dish.

10. A method of satellite-based communication, comprising the steps:
   providing a geostationary satellite;
   providing a hub station including a hub transmitter operating on a first band frequency, a hub receiver operating on a second band frequency, and a hub server;
   wherein said first band operates at a frequency band between 3.400 GHz and 8 GHz, and said second band is in the Ku frequency band;
   providing a remote station including a remote server having a processor, a remote transmitter operating on said second band frequency, a remote receiver operating on said first band frequency, and a hybrid antenna including an antenna dish, said antenna operating on both of said first and second band frequencies;

transmitting information on said first band frequency from said hub station to said geostationary satellite using said hub transmitter, and further transmitting that information from said geostationary satellite to said remote station hybrid antenna;

receiving information on said second band frequency from said geostationary satellite at said hub station using said hub receiver;

monitoring the output power of the remote transmitter with said hub server;

providing instructions from said hub server to said remote server using said first band frequency; and modifying the output power level of the remote transmitter using said remove server.

11. The system of claim 10, wherein said first band is in the C frequency band.

12. The method of claim 10, wherein said first band operates at a frequency between 3.400 GHz and 4.800 GHz.

13. The method of claim 12, wherein said antenna dish front face has a diameter between 1.5 meters and 4.6 meters.

14. The method of claim 10, wherein said second band operates at a frequency between 13.25 GHz and 14.5 GHz.

15. The method of claim 10, wherein said antenna dish is an offset clear aperture dish, including a feed assembly located at an angle offset from an axis running perpendicular to the center of a front face of said antenna dish.

* * * * *